United States Patent
Price et al.

(10) Patent No.: US 9,715,598 B2
(45) Date of Patent: Jul. 25, 2017

(54) AUTOMATIC SECURE ESCROWING OF A PASSWORD FOR ENCRYPTED INFORMATION AN ATTACHABLE STORAGE DEVICE

(75) Inventors: William P. Price, Lake Havasu City, AZ (US); Gary Streuter, San Clemente, CA (US); Eric Robinson, Junction City, OR (US)

(73) Assignee: Invysta Technology Group, Irvine, CA (US)

( * ) Notice: Subject to any disclaimer, the term of this patent is extended or adjusted under 35 U.S.C. 154(b) by 0 days.

(21) Appl. No.: 13/297,322

(22) Filed: Nov. 16, 2011

(65) Prior Publication Data

US 2012/0131336 A1    May 24, 2012

Related U.S. Application Data

(60) Provisional application No. 61/414,679, filed on Nov. 17, 2010.

(51) Int. Cl.
*G06F 21/78* (2013.01)

(52) U.S. Cl.
CPC ...... *G06F 21/78* (2013.01); *G06F 2221/2107* (2013.01)

(58) Field of Classification Search
CPC . G06F 21/78; G06F 2221/2107; H04L 9/0894
USPC .......................................... 713/165; 380/286
See application file for complete search history.

(56) References Cited

U.S. PATENT DOCUMENTS

| | | | |
|---|---|---|---|
| 6,199,163 B1 * | 3/2001 | Dumas et al. | 713/183 |
| 6,904,493 B2 * | 6/2005 | Chiao et al. | 711/103 |
| 7,215,771 B1 * | 5/2007 | Hamlin | 380/44 |
| 7,469,263 B2 * | 12/2008 | Higashiura et al. | |
| 7,546,630 B2 * | 6/2009 | Tabi | 726/2 |
| 7,765,373 B1 * | 7/2010 | Merry et al. | 711/163 |
| 8,127,146 B2 * | 2/2012 | Thom et al. | 713/189 |
| 2008/0195768 A1 * | 8/2008 | Lowe et al. | 710/14 |
| 2010/0266132 A1 * | 10/2010 | Bablani et al. | 380/286 |

OTHER PUBLICATIONS

Eric Lawrence (Why Won't IE Remember My Login Info? MSDN Blogs, Sep. 10, 2009 7:46 PM, 6 pages).*

* cited by examiner

*Primary Examiner* — Oleg Korsak
(74) *Attorney, Agent, or Firm* — Law Office of Scott C Harris, Inc

(57) ABSTRACT

External data storage device queries the user for a password on at least the first attachment. The password is escrowed in encrypted form. If the user elects this option, the password is then passed to an encryption module which unlocks the encrypted file or partition and upon subsequent attachments of the external data storage device may automatically unlock the encrypted file or partition using the securely escrowed password. The escrow of the encrypted password is managed in an external storage device containing the encrypted file or partition.

10 Claims, 3 Drawing Sheets

AUTOMATIC SECURE ESCROWING OF A PASSWORD FOR ENCRYPTED INFORMATION AN ATTACHABLE STORAGE DEVICE

CROSS-REFERENCE

The present application claims priority from provisional application No. 61/414,679, filed Nov. 17, 2010, the disclosures of which are hereby incorporated by reference.

FIELD OF INVENTION

The invention relates to secure escrowing of encryption password and keys.

BACKGROUND

Both home users of personal computers and corporate IT departments generally believe that important or sensitive data should be protected by backing up that data and securing it from thief by encrypting it. The reality is that very few people or organizations actually do either let alone both actions.

While backing up data requires the user or organizations to overtly do something such as manually launching a software program which most people may do for some period of time but will then taper off and evidentially not be bothered. The same is true of encrypting data. The average person will rarely encrypt or decrypt data files over the long term because of the minimal effort required.

What is needed is some method that will remove even the minimal amount of effort on the part of the user or organization to encrypt and protect their data.

SUMMARY

The purpose of the invention is to make data encryption, for data residing on attachable or portable storage devices, transparent to the user.

In one embodiment of the invention the user need only to attach a portable or external storage device to his PC and enter a password one time when the attached data storage device is connected to the PC for the first time. On subsequent attachments of the portable or external storage device to his PC the user [does] not [need to] enter a password. This embodiment of the invention only requires user intervention one time and never again.

In another embodiment of the invention which is intended for the corporate user, the Information Technology department pre-configures the portable or external storage device and "pushes" the encrypted or otherwise protected password from a secure environment down to the user's personal computer after which the user need only attach the external or portable storage device to the computer and the protected data residing on the storage device will be automatically unlocked.

In another embodiment of the invention, the user will attach an external or portable storage device to his PC then purchase a protected dataset, more commonly referred to as a vault, from a web site which will download the vault and place it on the external or portable storage device and will place an encrypted or otherwise protected password onto the PC that will be used to unlock the encrypted vault when the external or portable storage device is reattached to the PC. The user can then have access to protected data contained on the external or portable storage device without having to enter a password every time the device is attached to his personal computer.

These and other embodiments will be explained in detail which will be clear to one skilled in the art by examining the following drawings and detailed descriptions.

DICTIONARY

The following terms are used in the description and claims of the invention.
1. Processor based computing devices A processor based computing device is any device containing a microprocessor, internal memory used for storage of executable software programs and their associated data, operating system and executable software computer code more typically called software programs. These programs are separate from the operating system software of the microprocessor and are typically called application programs or simply software programs.

A processor based computing device may be any but not limited to the following such devices: desktop personal or workstation computers, laptop personal computer, tablet computers, cell phones, Personal Digital Assistants (PDAs), in vehicle computer systems, aircraft based computer systems, industrial control systems, consumer electronic systems such as televisions, multimedia players, game consoles, etc.
2. Escrow software program An escrow software program is a software program that is loaded from a data store such as found on but not limited to processor based computing devices, external data storage devices and network storage. This program contains the program code necessary to form an encryption key used to encrypt a password entered by the user and to save the password in a data store if directed to do so by the user.
3. Encryption software program or hardware module An encryption software program or hardware module is used to unlock and decrypt or encrypt and lock data contained inside an encrypted file, folder or partition contained on an external data storage device which may be a device such as a flash memory drive attached to a processor passed computer device or, an encrypted file, folder or partition contained on network storage. The module may be based in a software code or may be based in an encryption chip which itself may also contain a microprocessor and software to perform the encryption and decryption of files, folders or partitions.
4. Encrypted files, folders or partitions located on an externally attachable data storage device Encrypted files, folders or partitions are data objects that have been encrypted and reside on a data store other than one contained on the processor based computing device. The externally attachable data storage device may be, but not limited to, a flash memory device, a rotating memory device, an optical data storage device or a data storage device located on a network or Internet domain connected to the processor based computing device.

5. Information Technology (IT) Department

An IT department provides businesses with sets of core services to help execute the business strategy: business process automation, providing information, connecting with customers, and productivity tools. The present invention falls under the core services of productivity tools.

DETAILED DESCRIPTION OF THE INVENTION

Figure 1:
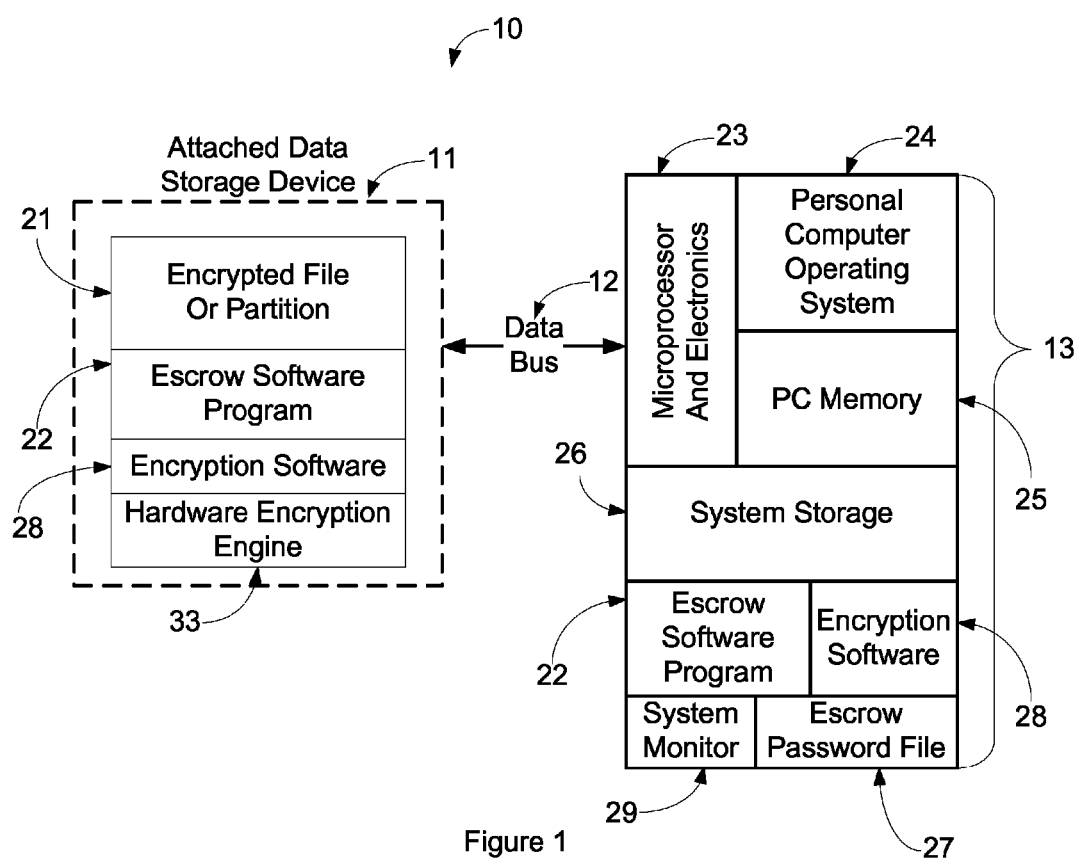
FIG. 1 is a depiction of a personal computer with an attached storage device shown containing the software necessary for the invention to be implemented.

Now referencing FIG. 1 where 10 depicts a personal computer 13, an attached data storage device 11 and data bus 12. In this depiction attached data storage device 11 would most typically be a USB thumb drive containing an encrypted file or partition 21, escrow software program 22, encryption software 28 or hardware encryption engine 33.

Encrypted file or partition 21, escrow software program 22, and encryption software 28 would have been placed on attached data storage device 11 as part of an operation or process which is not part of the invention. Attached data storage device 11 may have hardware encryption engine 33 in the form of an integrated circuit chip as part of the electronics that make up attached data storage device 11. When attached data storage device 11 contains hardware encryption engine 33, encryption software 28 would normally not be placed on attached data storage device 11.

The invention is intended to interact with encrypted objects such as encrypted file or partition 21, encryption software 28 or hardware encryption engine 33 which are created by processes outside the scope of the invention.

Basic Embodiment

Now referencing FIG. 1, Encrypted file or partition 21, more typically called an encrypted vault, may be encrypted by any encryption program such as True Crypt which is an open source software encryption program or by any other encryption program capable of encrypting a file and/or partition. Encrypted file or partition 21 may also be a partition on attached data storage device 11. In such an embodiment, attached data storage device 11 would have had some portion of its address space formatted such that it appears to a file system as a completely separate logical storage device. In this embodiment the entire partition would be encrypted.

In one embodiment, escrow software program 22 residing on attached storage device 11 is launched when attached data storage device 11 is connected to personal computer 13 through data bus 12. In this embodiment personal computer operating system 24 monitors data bus 12 and when a storage device is connected to personal computer 13 via data bus 12, personal computer operating system 24 will scan attached storage device 11 and if an executable software program is present on attached data storage device 11 personal computer operating system 24 will launch escrow software program 22 by copying it into PC memory 25 and starting it executing. If personal computer operating system 24 does not have the capability to auto launch escrow software program 22 then the user may launch escrow software program 22.

Once escrow software program 22 is launched, it will copy encryption software 28, if present, from attached storage device 11 and start it executing. Escrow software program 22 will then determine if attached data storage device 11 has previously been attached to personal computer 13 by examining system storage 26 for escrow password file 27. At this point there are a number of possible actions as described in the following:

1. If escrow software program 22 locates escrow password file 27 on system storage 26, it will assemble a key made up of a plurality of several unique and predetermined data objects of which some or all will not be under the control of the user such as the serial number of the microprocessor in personal computer 13, the ID of the user who is currently logged onto personal computer 13, the ID or serial number of attached storage device 11, and/or any other unique data items that have been predetermined to constitute the key. These data items will be hashed together and used for the key. Once the key is prepared, escrow software program 22 will attempt to unlock escrow password file 27 and retrieve the password which is then passed to encryption software 28 for unlocking encrypted file or partition 21 on attached data storage device 11. If attached data storage device 11 has hardware encryption engine 33 present then encryption software 28 will not be present on attached data storage device 11. For this case, escrow software program 22 will pass the password that had been contained in escrow password file 27 to hardware encryption engine 33 by issuing a command to attached data storage device 11 over data bus 12 where the command sent over data bus 12 will contain the password. In this embodiment, the user will never see a prompt or query for a password and encrypted file or partition 21 will have been automatically unlocked without the user having to enter a password.

2. If escrow software program 22 cannot locate escrow password file 27 on system storage 26 it will query or prompt the user for the password and if the user wants the password to be remembered on personal computer 13. If the user enters the password but does not want the password to be remembered (escrowed) escrow software program 22 will pass the password to encryption software 28 or to hardware encryption engine 33 depending on the configuration of attached data storage device 11 for unlocking encrypted file or partition 21. If the user indicates that he wants the password remembered or escrowed, escrow software program 22 will create escrow password file 27 by collecting a predetermined set of data objects of which some or all will not be under the control of the user such as the serial number of the microprocessor in personal computer 13, the ID of the user who is currently logged onto personal computer 13, the ID or serial number of attached storage device 11, and/or any other unique data items that have been predetermined to constitute the key. These data items will be hashed together and used for the encryption key to encrypt the password entered by the user and will save it as escrow password file 27 in system storage 26. Once escrow password file 27 has been created, escrow software program 22 will pass the password to encryption software 28 or hardware encryption engine 33 depending on the configuration of attached data storage device 11 after which encryption software 28 or hardware encryption engine 33 will unlock encrypted file or partition 21 located on attached data storage device 11.

Network Embodiment

Figure 2:
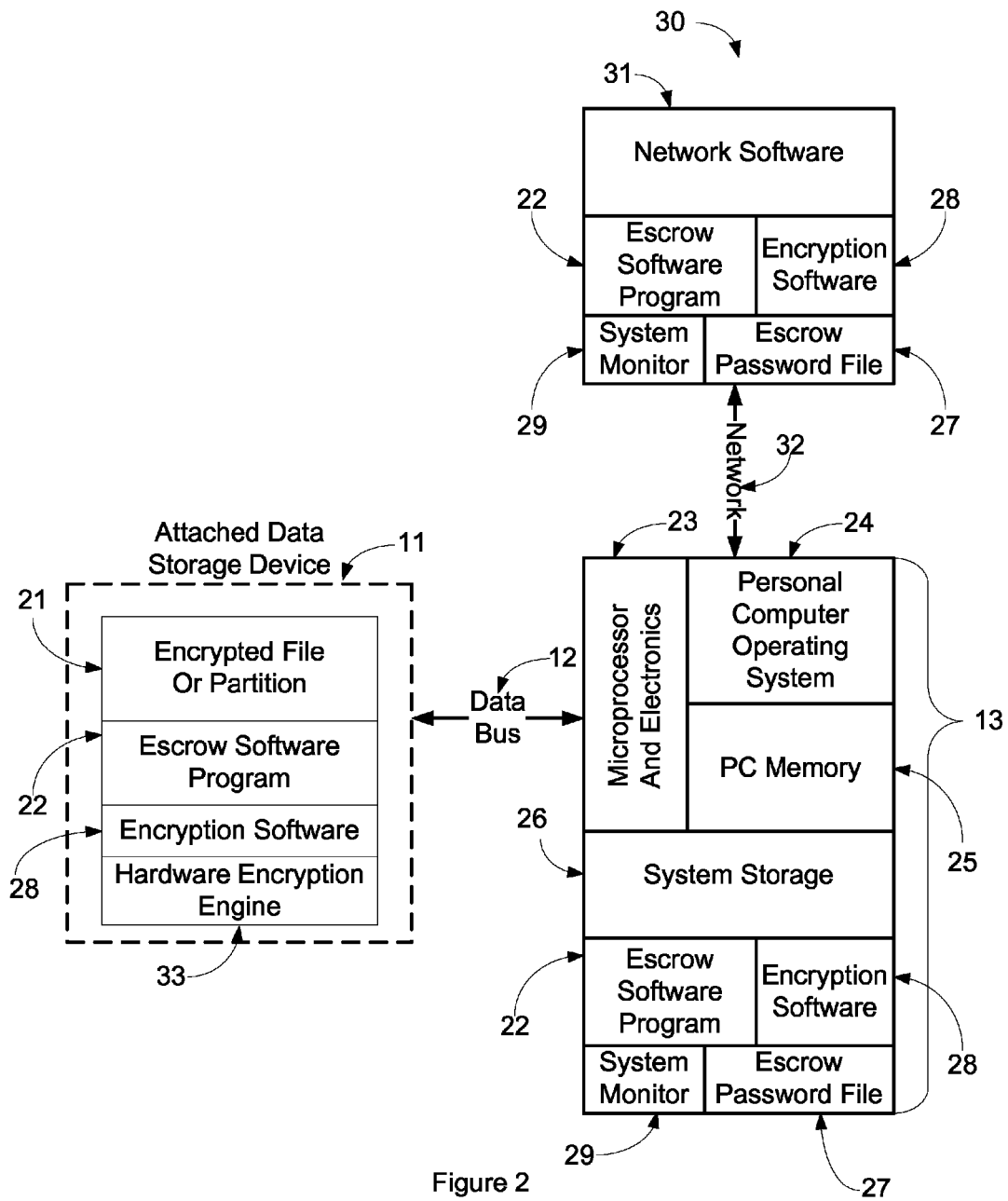
FIG. 2 is a schematic of an attached storage device with the encrypted file and software and a schematic of a personal computer connected to a network server where software programs and escrow files are stored.

In another embodiment shown in FIG. 2, network server 30 is connected to personal computer 13 via network 32. Network server 30 contains network software 31. In this embodiment which is typical of the relationship between a user's personal computer and a server under control of an IT department, creation of the escrow password file 27 is created by the IT department on network server 30. The IT department will pull the predetermined set of data objects for constructing the password for escrow password file 27 from personal computer 13 over the network. These data objects, some or all of which may not be under the control of the user such as the serial number of the microprocessor in personal computer 13, the ID of the user who is currently logged onto personal computer 13, the ID or serial number of attached storage device 11, and/or any other unique data items that have been predetermined to constitute the key from personal computer 13 via network 32. Network software 31 will formulate the key for encrypting escrow password file 27 using the pulled data objects and will generate a password which is then encrypted using the formulated key. Network software 31 will then push escrow password file 27 down to personal computer 13 via network 32 and will cause escrow password file 27 to be stored on system storage 26 at a known location. The IT department will then create encrypted file or partition 21 and will push it down and place it on attached data storage device 11 along with escrow software program 22 and encryption software 28. Attached data storage device 11 will then be given to the user who will attach attached data storage device 11 to personal computer 13 through data bus 12. At this point in the embodiment, escrow software program 22 will be launched and it will copy and start executing encryption software 28 after which escrow software program 22 will locate escrow password file 27, formulate the key to unlock escrow password file 27 and will retrieve the password which it will then be passed to encryption software 28 or to hardware encryption engine 33 depending on the configuration of attached data storage device 11 which will unlock the encrypted file or partition on attached data storage device 11.

In a variation on the network embodiment, network server 31 will push down and install software modules system monitor 29, encryption software 28, and escrow software program 22 on personal computer 13. In this variation of the network embodiment, network server 31 negates the need to load escrow software program 22 and encryption software 28 onto attached data storage device 11. This ensures that the user cannot even attempt to unlock encrypted file or partition 21 on any computer not connected to the network. In this embodiment of the invention, system monitor 29 continually monitors data bus 12 and when it detects that attached data storage device 11 has been connected to personal computer 13 through data bus 12 it will check to see if encrypted file or partition 21 is present on attached data storage device 11. If system monitor 29 determines encrypted file or partition 21 is present on attached data storage device 11 it will retrieve the password from escrow password file 27 residing on network server 30 and will pass the password to encryption software 28 or to hardware encryption engine 33 depending on the configuration of attached data storage device 11.

Figure 3:
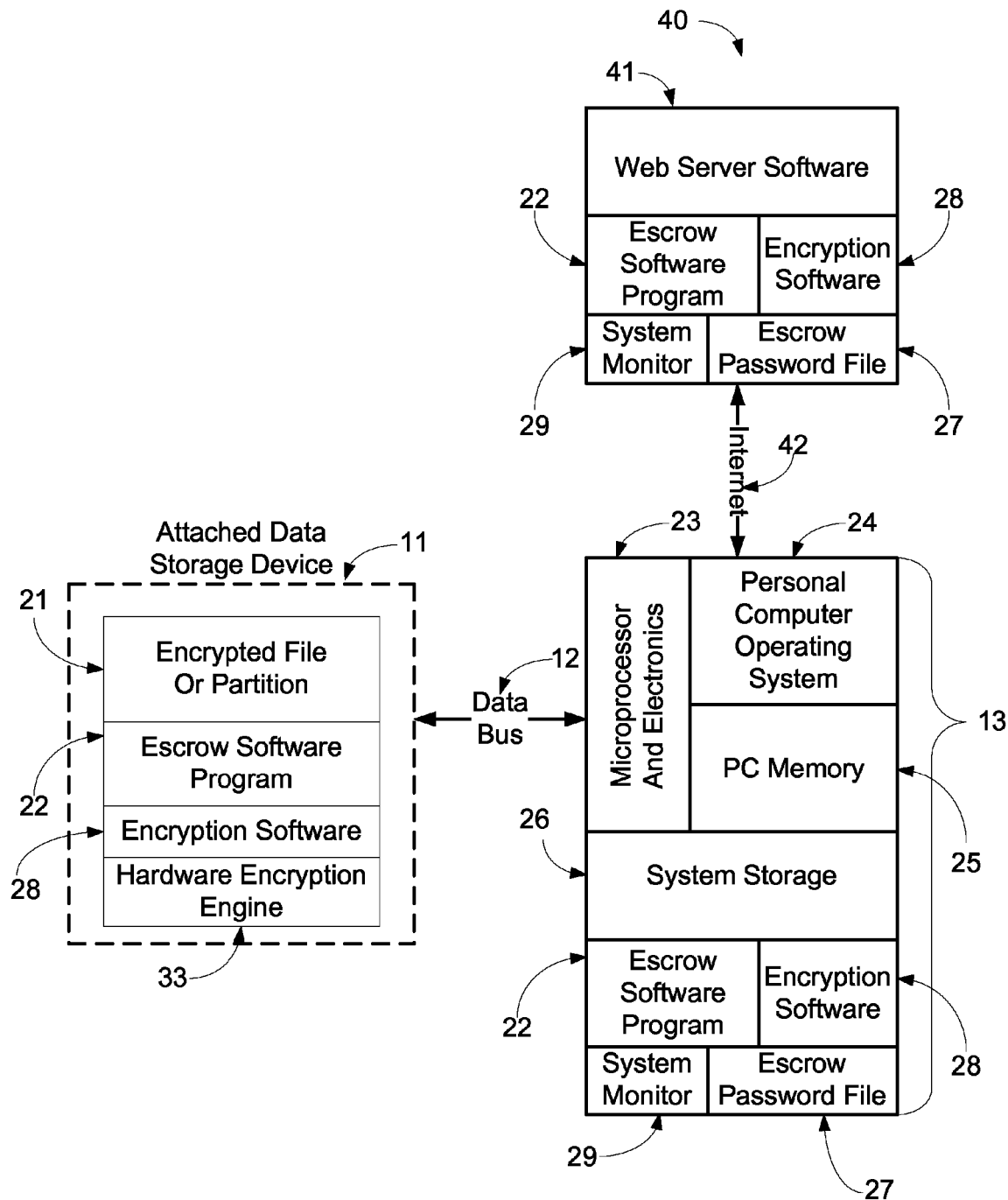
FIG. 3 is a schematic of an attached storage device with the encrypted file and software and a schematic of a personal computer connected to a web server where software programs and escrow files are stored.

In another variation of the network embodiment of the invention, a web server 40 which will reside on a wide area network such as the internet as shown in FIG. 3 with web server software 41 that performs a series of actions resulting in encrypted file or partition 21 being created on attached data storage device 11. In this variation of the network embodiment, the user may connect attached data storage device 11 which at the time of connection contains no data, to personal computer 13 via data bus 12. The user may connect to web server 40 which will cause web server software to push down escrow software program 22, system monitor 29, encryption software 28, and escrow password file 27 to system storage 26 residing on personal computer 13. In this embodiment web server software 41 will retrieve a predetermined set of data objects from personal computer 13 of which some or all are not under the control of the user such as the serial number of the microprocessor on personal computer 13, the ID of the user who is currently logged onto personal computer 13, the ID or serial number of attached data storage device 11, and/or any other unique data items that have been predetermined to constitute the key from personal computer 13 and formulate a key with which to encrypt a password that has been randomly generated by web server 40. After the password has been encrypted thereby creating escrow password file 27 it will be pushed down to personal computer 13 via internet 42 and saved in system storage 26. Web server software 41 may create and download encrypted file or partition 21 in which case encrypted file or partition 21 will be a file which will be saved on attached data storage device 11. Web server 40 may also, via web server software 41, format attached data storage device 11 in real time such that encrypted file or partition 21 is an encrypted partition.

In another variation of this embodiment, escrow software program 22 and encryption software 28 are moved to attached data storage device 11 after they are pushed down to personal computer 13 by web server 40. In this embodiment, system monitor 29 and escrow password file 27 will not be created by web server software 41. In this embodiment of the invention, the user will, after encrypted file or partition 21, escrow software program 22, and encryption software 28 have been moved to attached data storage device 11, un-attach and re-attach attached data storage device 11 to personal computer 13 at which time the process will be identical to that described in the basic embodiment of the invention above.

We claim:

1. A personal computer system, comprising:
    a personal computer, having a port operating for receiving an externally attached data storage device and operating to read encrypted material from said externally attached data storage device;
    said personal computer executing an escrow software program, said escrow software program executed for managing escrowing of an encryption information;
    said personal computer offering a user an option of escrowing an encryption password in an escrow file and if said user accepts the option of escrowing said encryption password,
    then said personal computer executing to first receive a password from said user and encrypting said password using an encryption key constructed with a plurality of unique characteristics, said plurality of unique characteristics including characteristics of at least one of said external data storage device and said personal computer and a user, at least one of which unique characteristics not being under control of the user, to form an encrypted password, and said escrow software program executing to store said encrypted password in said escrow file;
    said escrow software program operating to form a decryption process for data that is stored on said externally attached data storage device by checking said escrow file for a password, and
    if said password is found, then decrypting said password to form a decrypted password, using said unique characteristics if said unique characteristics match to the unique characteristics used to encrypt the encrypted password, and using said decrypted password to form a key to unlock said encrypted material residing on said attached external data storage device, without said user being required to re-enter said password that is stored in said escrow file, else if said checking by said escrow software program does not find the password in said escrow file, then prompting the user to enter the password, and using the entered password to form said key and use said key to unlock said encrypted material residing on said attached external data storage device, and else if said unique characteristics do not match to the unique characteristics used to encrypt the encrypted password, then prompting the user to enter the password, and using the entered password to form said key and use said key to unlock said encrypted material residing on said attached external data storage device.

2. The system of claim 1 further comprising said externally attached data storage device, which is connected to the personal computer through one of a serial, parallel, or optical bus port.

3. The system of claim 1, wherein
said escrow file is saved on a network to which said personal computer is attached.

4. The system as in claim 1, wherein said unique characteristics are stored on a network server connected to a local area network.

5. The system as in claim 1, wherein said unique characteristics are stored on:
a web site accessed by a user via the internet.

6. The system as in claim 1, wherein said escrow file is stored in a memory attached to said personal computer.

7. The system as in claim 1, wherein said encrypted material includes encrypted files or partitions.

8. The system as in claim 1, wherein said encryption process is one of a software executing on said personal computer or a hardware encryption module.

9. The system of claim 1, wherein said escrow software program is stored on said externally attached data storage device.

10. A method of operating a computer, comprising:

receiving an externally attached data storage device into a port of the computer;

operating to read encrypted material from said externally attached data storage device;

executing said escrow software program on said computer for managing escrowing of encryption information;

offering a user an option of escrowing an encryption password in an escrow file and if said user accepts the option of escrowing said encryption password, and then executing to first receive a password from said user and encrypting said password using an encryption key constructed with a plurality of unique characteristics of at least one of said external data storage device and said computer and a user, at least one of which unique characteristics not being under control of the user, to form an encrypted password;

executing to escrow said password in said escrow file;

operating to form a decryption process for data that is stored on said externally attached data storage device by checking said escrow file for a password, and if said password is found, then decrypting said password to form a decrypted password, using said unique characteristics if said unique characteristics match to the unique characteristics used to encrypt the encrypted password, and using said decrypted password to form a key to unlock said encrypted material residing on said attached external data storage device, without said user being required to re-enter said password that is stored in said escrow file, else if said checking by said escrow software program does not find the password in said escrow file, then prompting the user to enter the password, and using the entered password to form said key and use said key to unlock said encrypted material residing on said attached external data storage device.

* * * * *